Dec. 15, 1970          R. W. STOFFEL          3,547,490
LINEAR RETRACTOR WITH PROGRAMMED BELT CLAMPING MEANS
Filed Nov. 9, 1967                        4 Sheets-Sheet 1

INVENTOR.
ROBERT W. STOFFEL
BY
ATTORNEYS

Dec. 15, 1970   R. W. STOFFEL   3,547,490
LINEAR RETRACTOR WITH PROGRAMMED BELT CLAMPING MEANS
Filed Nov. 9, 1967   4 Sheets-Sheet 2

INVENTOR.
ROBERT W. STOFFEL
BY
ATTORNEYS

Dec. 15, 1970   R. W. STOFFEL   3,547,490
LINEAR RETRACTOR WITH PROGRAMMED BELT CLAMPING MEANS
Filed Nov. 9, 1967   4 Sheets-Sheet 3

INVENTOR.
ROBERT W. STOFFEL
BY
ATTORNEYS

Dec. 15, 1970     R. W. STOFFEL     3,547,490
LINEAR RETRACTOR WITH PROGRAMMED BELT CLAMPING MEANS
Filed Nov. 9, 1967     4 Sheets-Sheet 4

INVENTOR.
ROBERT W. STOFFEL
BY

ATTORNEYS

United States Patent Office

3,547,490
Patented Dec. 15, 1970

3,547,490
LINEAR RETRACTOR WITH PROGRAMMED BELT CLAMPING MEANS
Robert W. Stoffel, Ferndale, Mich., assignor to Jim Robbins Seat Belt Co., Royal Oak, Mich.
Filed Nov. 9, 1967, Ser. No. 681,756
Int. Cl. A62b 35/00; B60r 21/10
U.S. Cl. 297—388                    28 Claims

ABSTRACT OF THE DISCLOSURE

A linear retractor for a vehicle safety belt having a novel emergency actuated belt-clamping mechanism for clamping the belt to the vehicle during an abnormal situation, but permitting the occupant to perform normal body movements in an unrestrained manner during normal vehicle operation.

The actuating means respond to the belt being extended at an abnormal rate from the retractor and are coupled through a separable linkage to the clamping means so that they cannot be triggered until a predetermined amount of belt has been withdrawn from the retractor.

BACKGROUND OF THE INVENTION

Field of the invention

This invention relates to vehicle safety seat belt systems and more particularly to a linear retractor having emergency actuated belt-clamping means which are inoperable until a predetermined amount of the belt has been withdrawn from a stored position within the retractor.

Description of the prior art

Developments in the evolution of vehicle safety seat belt devices have indicated that there are situations where it is desirable to store the unused portion of the seat belt into a series of linear sections rather than wound into a roll around a reel. Retractors of this character are often referred to as linear retractors and are employed where storage space is a prime consideration. For instance a shoulder belt which is mounted to an overhead portion of the vehicle must be stored within a relatively narrow space between the roof panel and the head liner for appearance reasons. Linear retractors have also been considered where the belt is to be stored within the seat assembly and other locations besides the overhead vehicle structure.

Emergency actuated linear retractors, like reel retractors, must conform to a number of design considerations including the comfort of the occupant during normal driving conditions as well as the reaction interval during an emergency situation when the belt must apply a restraining force on the occupant so that he does not come into an injury-producing impact with various non-yielding surfaces within the passenger compartment. For this reason considerable effort has been directed towards providing an effective clamping means for a linear retractor which will lock tight in an emergency situation and release easily.

A second major problem is related to the means which respond to the emergency situation to actuate the clamping means. Normally the actuating means are responsive to belt movement. During an abnormal vehicle condition such as a collision, the occupant tends to suddenly and violently change his relative position within the vehicle under the influence of inertial forces acting on his body. During the short interval when the vehicle is decelerating and the occupant is continuing his former travel, the belt begins to extend from the retractor at an accelerated rate. The problem has been to develop actuating means which reliably respond to this accelerated belt motion during an emergency situation.

Another problem related to actuating means which are responsive to belt movement is a tendency to "pre-lock" when the occupant initially withdraws the belt from its fully stored position in the retractor. If the belt is sharply drawn from within the retractor, the actuating means sense a false signal and actuate the clamping means so that the occupant experiences both difficulty and annoyance in withdrawing a sufficient length of the belt for coupling to the complementary portions of the seat belt system.

The broad purpose of the present invention is to provide an improved belt-clamping device which can be mounted on a linear retractor housing and which locks the belt tight when actuated and releases easily. In addition it is the purpose of the present invention to provide a reliable actuating mechanism which responds to the belt being withdrawn from the retractor housing at an abnormal rate but is programmed to actuate the clamping means only after a predetermined amount of the belt has been extended from a stored position from within the retractor housing to obviate the problem of "pre-locks."

SUMMARY

The preferred embodiment of the present invention comprises an elongated channel having one end formed into an open ended housing defining a belt-receiving opening. The channel is adapted for mounting to an overhead portion of a vehicle. A safety seat belt is adapted to extend from the housing and downwardly over a shoulder of a seated occupant for coupling to a lap belt to form a seat belt system. When the belt is not employed as a body restraining element, it is withdrawn into the channel to a stored position.

The preferred belt-clamping mechanism is mounted within the housing adjacent the belt-receiving opening. The channel rearwardly of the clamping mechanism provides a storage area for the belt and for the take-up means.

The belt take-up means comprises a fixed roller supported by the sidewalls of the channel adjacent an anchor pin. A U-shaped carriage with a pair of rollers is longitudinally movable within the channel toward and away from the anchor pin. The belt extends from the anchor pin and is successively wound around the carriage mounted rollers and the fixed roller so that it is formed into a series of parallel, linear sections before it extends out through the belt-receiving opening. A coil spring mounted within the housing normally biases the carriage away from the anchor pin. As the carriage moves away from the anchor pin, the length of the linear stored sections of the belt elongate so that the belt is withdrawn into the housing. A pull-out force applied on the extended end of the belt causes the carriage to move toward the anchor pin so that the linear belt sections are reduced in length to accommodate the amount of belt that is withdrawn.

The belt is partially wrapped around a guide roller mounted immediately adjacent the belt-receiving opening of the housing. Thus the guide roller rotates at a rate proportional to the longitudinal movement of the belt. The roller is keyed on a pin having its ends extending through the opposite sidewalls of the channel. A pair of actuating pawls are mounted on spool means adjacent each end of the roller pin.

The pawls are eccentrically mounted on the spools and have an abutment normally revolving around the axis of the pin in an inner orbit when the roller is rotating at a normal rate. When the belt is being extended from its stored position at an abnormal rate, this abnormal movement is reflected in an increased rotational rate of the roller which in turn causes the pawls to pivot about their eccentric axis under the influence of centrifugal force and their own inertia so that the abutment revolves in an outer orbit.

A motion-transmitting linkage adapted to connect the actuating pawls and the belt-clamping means has an operative and an inoperative state. A switching plate mounted on the channel senses the position of the carriage and is arranged to pivot an actuating link of the linkage. When less than a predetermined amount of belt has been withdrawn from the housing as reflected in the position of the carriage the actuating link is in a position wherein it clears the outer orbit of the actuating pawls. Thus although the actuating pawls respond to the belt being extended at an abnormal rate, they are in effect disconnected from the belt-clamping mechanism. When the carriage moves towards a position corresponding to the extension of a predetermined amount of belt from its stored position, the carriage movement is sensed by the switching plate which causes the actuating link to drop into an interference position with the outer orbit of the actuating pawls. The link then becomes an operative connection between the actuating pawls and clamping mechanism until the belt is retracted into its stored position.

The preferred clamping mechanism comprises a pair of cooperating jaw members mounted between a pair of spaced bearing surfaces, including upper and lower bearing surfaces. The lower bearing surface is inclined toward the upper bearing surface with one of the jaw members movably mounted on the inclined surface. The belt is guided between the clamping surfaces of the jaws so that when the jaws are moved adjacent the narrow end of the bearing surfaces, they become wedged with the belt between the bearing surfaces.

It has been found that by providing a sheet of a low friction plastic bearing materials between the jaws and the bearing surfaces, and by forming the inclined bearing surface at an angle of about 17° with respect to the upper bearing surface, the two jaw members will readily move toward a locked position which is maintained as long as a tensile force is acting on the extended end of the belt. When this tensile force is released, the jaws readily return under a nominal retracting force toward a belt-release position.

Another form of the preferred clamping mechanism contemplates a pair of cooperating jaw elements including a lower wedge shaped jaw element mounted on a series of roller bearings on the inclined bearing surface.

The preferred embodiment of the invention illustrates a novel form of belt-clamping mechanism composed of a relatively few components which can be assembled into a compact, reliable device. The improved belt-clamping mechanism is mounted within a linear retractor and programmed for actuation only when the belt has been extended to an operating position and only when an emergency situation arises. The preferred retractor permits the occupant to perform nomal body movements under normal driving conditions in a relatively unrestrained manner even though embraced by a safety belt.

It is therefore an object of the present invention to provide an improved emergency-actuated belt clamping means for a linear retractor.

It is another object of the present invention to provide a linear retractor for a safety seat belt having a belt clamping mechanism actuated in response to belt motion, and with means for disabling the belt-clamping means until a predetermined amount of belt has been withdrawn from a stored position within the retractor.

Still another object of the present invention is to provide an improved seat belt retractor actuating mechanism responsive to an abnormal belt motion.

Still further objects and advantages of the present invention will readily become apparent to one skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENTS

Figure 1:
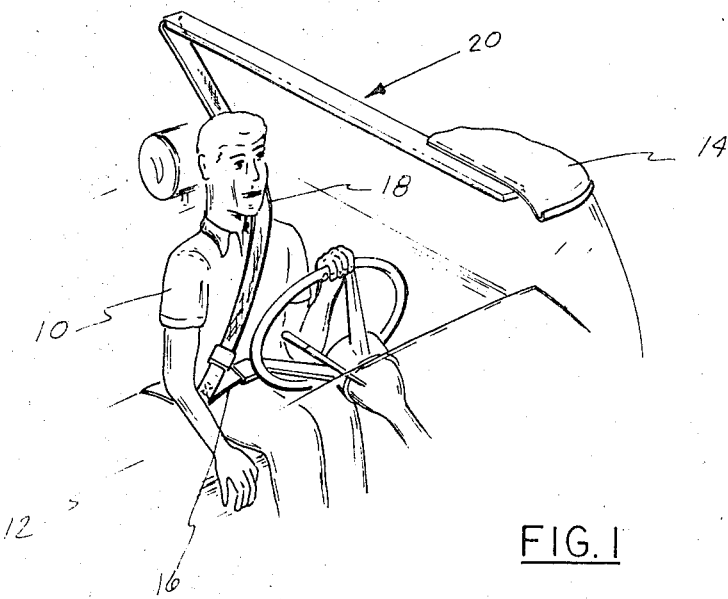
FIG. 1 is a perspective fragmentary view of a vehicle with an occupant coupled to an overhead safety seat belt system illustrating the preferred embodiment of the invention.

Now referring to the drawings, FIG. 1 illustrates a body 10 seated in a seat assembly 12 mounted within a vehicle 14. The body 10 is coupled to a seat belt assembly including a lap belt assembly 16 and a shoulder belt 18. The lap belt 16 and the shoulder belt 18 cooperate to apply a restraining force on the body 10 when the vehicle 14 experiences a sudden and violent deceleration, the belts 16 and 18 preventing the body 10 from continuing its forward motion so that he does not come into an injury-producing contact with the interior vehicle structure.

Seat belt configurations of this character are well known to those skilled in the art and are generally referred to as of the emergency locking type that is the belts allow the body 10 to perform normal body motions under normal driving conditions, however, during an emergency the seat belts are clamped to the vehicle so that they apply a restraining force on the body 10.

The belt 18 extends from a retracting mechanism 20 of the liner retractor type which is preferably mounted to an overhead portion of the vehicle 14. As can be seen in FIG. 1, the retractor 20 is illustrated as being mounted directly over the body 10, however, it could as well be associated with a lap belt or mounted in another part of the vehicle such as within the seat assembly 12.

Figure 2:
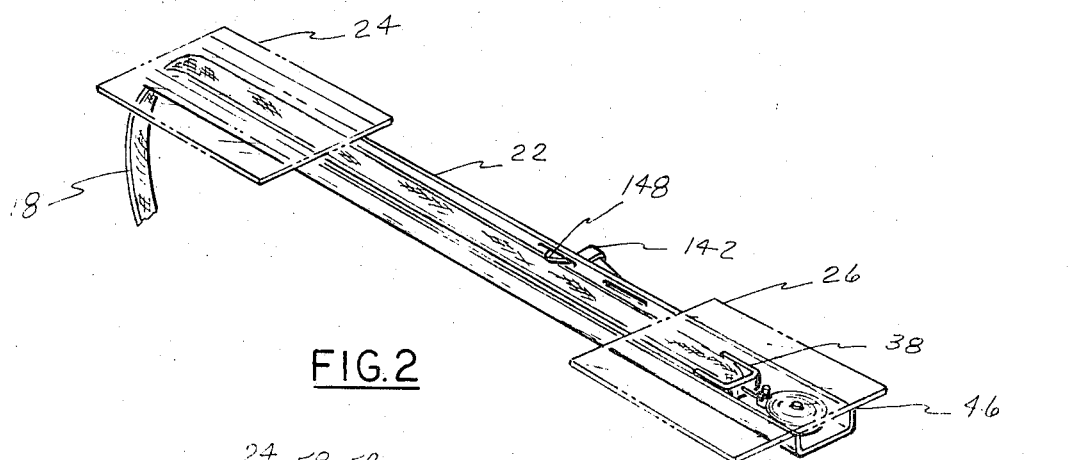
FIG. 2 is a perspective fragmentary view of the preferred seat belt retractor separated from the vehicle.
Figure 3:
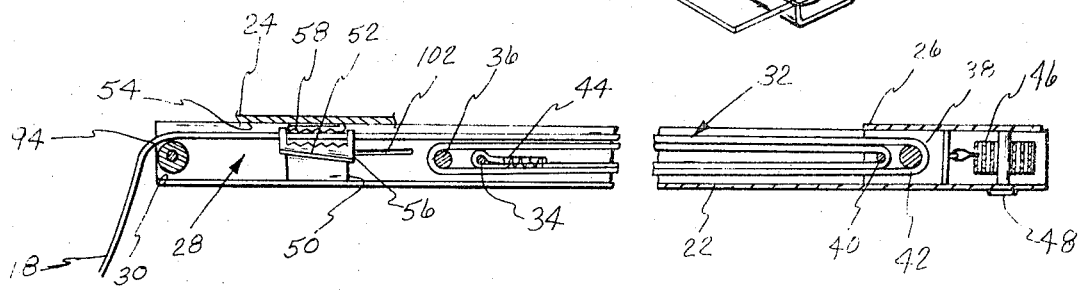
FIG. 3 is a longitudinal sectional view through the preferred retractor.

Referring to FIGS. 2 and 3, the preferred retractor comprises a housing formed of an elongated channel 22, open at its opposite ends and with a pair of mounting plates 24 and 26 attached at its forward and rear ends respectively to form a pair of open ended housings.

As can best be seen in FIG. 3, a belt-clamping mechanism generally indicated at 28 is mounted at the forward end of the channel 22 adjacent a belt receiving opening 30. A wind-up means generally indicated at 32 is mounted within the channel forwardly of the belt-clamping means.

The wind-up unit includes an anchor pin 34 fixed to the sidewalls of the channel 22. A roller member 36 is journalled on the sidewalls of the channel member 22 between the anchor pin and the clamping means 28.

A U-shaped carriage 38 is slidably mounted in the channel 22 toward and away from the anchor pin 34. A pair of roller members 40 and 42 are carried by the carriage. The belt 18 has a loop 44 stitched in its extreme end which is engaged with the anchor pin 34. The belt extends from the anchor pin 34 and is successively wound around the rollers 40, 36 and 42 from which it extends toward the belt receiving opening 18.

A coil spring 46 journalled by a pin 48 at the extreme forward end of the channel 22 is connected to the carriage 38 and constantly biases the carriage 38 away from the anchor pin 34. Thus it can be seen that the carriage 38 tends to withdraw the belt 18 within the housing by increasing the length of the parallel, linear sections of belt wrapped between the rollers 36, 40 and 42. The spring 46 is chosen so that a nominal pull-out force applied to the extended end of the belt 18 will cause the carriage to move toward the anchor pin thereby reducing the length of the linear stored sections of the belt so that a sufficient amount of the belt can be withdrawn to accommodate the motions of the body 10.

Figure 5:
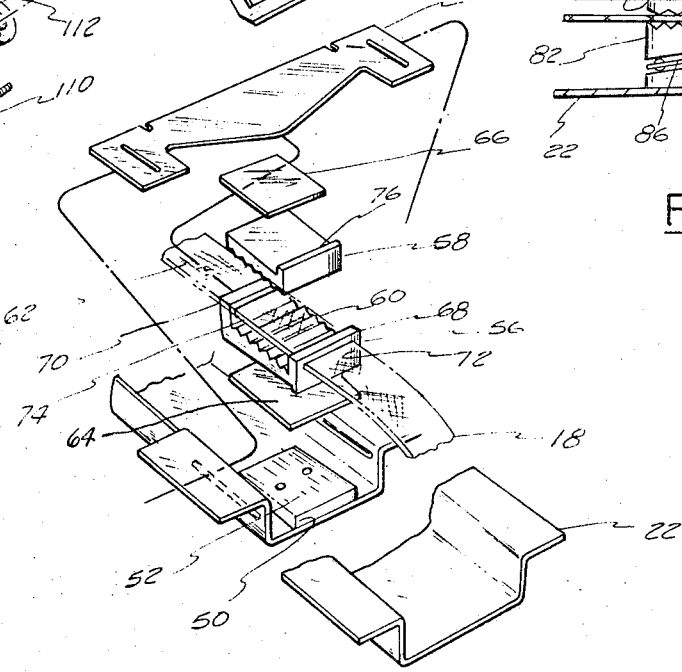
FIG. 5 is another exploded view showing the components of the clamping mechanism.

Now referring to FIGS. 3 and 5 for a description of the clamping means, a member 50 having an inclined bearing surface 52 is fixedly mounted on the base of the channel 22. The bearing surface 52 converges toward the plate 24 which for purposes of description forms an upper bearing surface 54. The inclined surface 52 is preferably sloped toward the surface 54 at an angle of approximately 17°.

A lower jaw member 56 and an upper jaw member 58 having clamping surfaces 60 and 62 respectively are mounted between the inclined bearing surface 52 and the upper bearing surface 54. A sheet 64 of a low-friction material such as Telflon is disposed between the inclined bearing surface 52 and the jaw member 56 so that the jaw member 56 can easily move up and down the inclined surface 52. Similarly a sheet 66 of a low-friction bearing material is disposed between the upper jaw member 58 and the bearing surface 54.

The clamping surfaces 60 and 62 are illustrated as being formed into a series of sharp cornered ridges, however, they could have complementary round cornered cross-sections so that they do not reduce the life or strength of the belt 18.

The lower jaw member 56 preferably has a ridge 68 at its forward edge and a similar ridge 70 along its rear edge, the ridges 68 and 70 cooperating to retain the upper jaw member 58 in position so that they move forwardly and rearwardly together.

The ridges 68 and 70 are formed with elongated apertures 72 and 74, respectively, adjacent the clamping surface 60 of the lower jaw member. The belt 18 is threaded through the apertures 70 and 72 with the upper jaw member 58 normally riding on the belt as it is extended from and retracted into its stored position.

The upper jaw member 58 has a small transverse ridge 76 adjacent its forward end for retatining the low-friction sheet 66 in position.

Normally the lower and upper jaw members are in a separated, belt-release position wherein the lower jaw member 56 is at the base of the inclined surface 52 so that the belt 18 can freely move between the belt clamping surfaces 60 and 62. However, the application of a force on the lower jaw 56 which moves it toward the belt-receiving opening 30, the lower jaw slides up the inclined surface 52 and carries the upper jaw 58 with it. As the two jaw members move toward the belt-receiving opening, the clamping surfaces 60 and 62 engage the belt 18 with the two jaw members 56 and 58 and the belt 18 becoming wedged between the member 50 and the plate 24. This wedged or belt-clamping condition continues until the force acting on the extended end of the belt 18 is released at which time the bias applied by the spring 46 acting on the belt withdraws the belt 18 rearwardly. This retracting force is sufficient to move the jaw members 56 and 58 rearwardly so that they return to the belt-release position.

Figure 6:
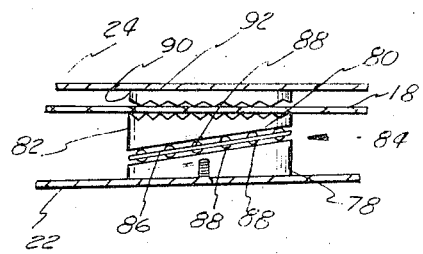
FIG. 6 is a sectional view of another preferred belt-clamping mechanism.

Another form of belt-clamping means, similar to the embodiment illustrated in FIG. 3, is shown in FIG. 6 and comprises a lower member 78 mounted on the base of the channel 22 and provided with an inclined bearing surface 80. A lower wedged shaped jaw member 82 is mounted on the inclined surface 80 by bearing means 84. Bearing means 84 consists of an apertured retainer 86 having a series of roller bearings 88 providing a force-transmitting means between the jaw member 82 and the member 78. An upper jaw member 90 having a clamping surface complementary to the clamping surface of the lower jaw member 82 is mounted above the belt 18 with a sheet of low friction material 92 providing a bearing surface between the upper jaw member 90 and the plate 24. Essentially the difference between the embodiment illustrated in FIG. 6 and the embodiment illustrated in FIG. 3 lies in the bearing means between the lower jaw member and the inclined surface.

Now referring to FIGS. 4, 7, 8 and 9 for a description of the preferred actuating mechanism, a guide roller 94 mounted on a pin 96 adjacent the belt-receiving opening 30 provides means for guiding the belt 18 as it extends from the channel 22 and is withdrawn into the channel 22. As can be seen in FIG 3, the belt 18 is wrapped around a circumferential portion of the roller 94 so that the roller rotates with the belt and reflects the belt movement.

Figure 4:
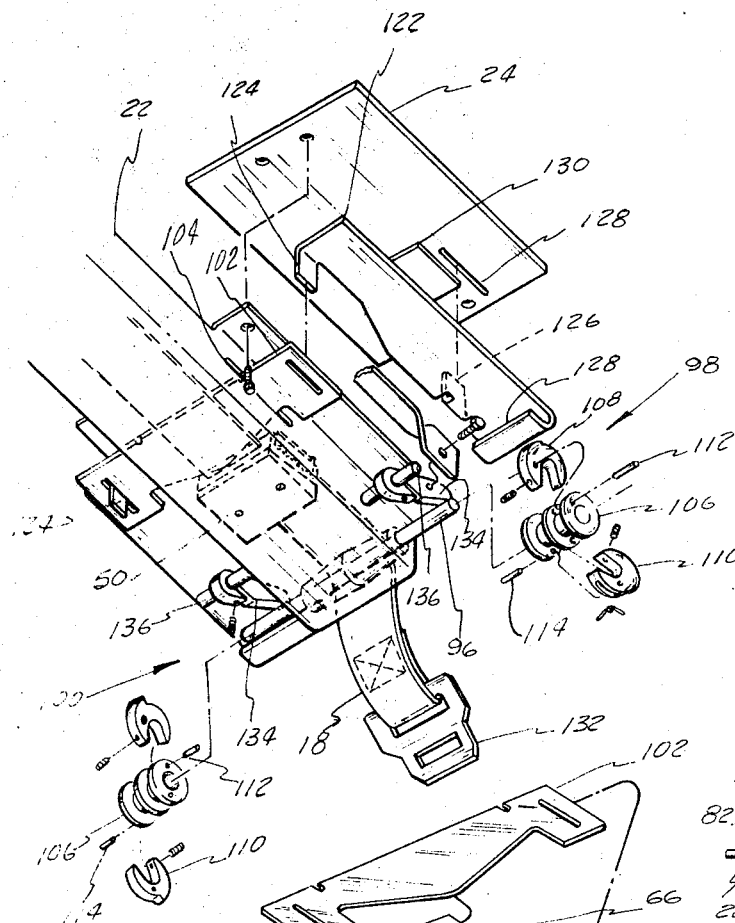
FIG. 4 is an exploded view showing the clamping mechanism and the actuating mechanism of the preferred retractor.

Referring to FIG. 4, actuating means 98 and 100 are mounted on the projecting ends of the pin 96 and are similar to one another. Thus the actuating means 98 will be described in detail, it being understood that the actuating means 100 is essentially the same as actuating means 98 except for a right and left hand relationship. The two actuating means cooperate to move an actuating member 102 which is supported in a pair of slots 104 formed in the sidewalls of the channel 22 and is normally in abutment with the lower jaw member 56.

The actuating means 98 comprises a spool-shaped member 106 carried on the end of the pin 96. A pair of pawls 108 and 110 are eccentrically mounted on the spool 106 by pins 112 and 114. The pawls 108 and 110 are similar to one another but are mounted on opposite sides of the axis of rotation of the pin 96.

Figure 9:
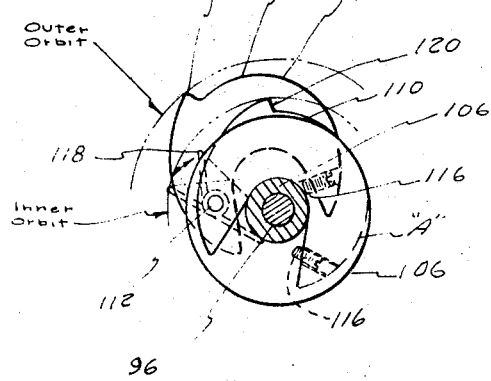
FIG. 9 is an enlarged view showing one of the locking pawls in its alternate positions.

Referring to FIG. 9 for a description of pawl 110, it is to be understood that the other three pawls operate in the same manner as pawl 110 so that a description of this pawl will illustrate the operation of the other pawls. Pawl 110 has a generally C-shaped configuration with one leg being pivotably eccentrically mounted on the spool 106. The pawl 110 substantially embraces the cylindrical center of the spool 106 with a set screw 116 carried by the spool's rim providing means for limiting the pivotal travel of the pawl.

A spring bias member 118 is mounted on the pin 112 and acts between the pawl and the spool to bias the pawl to a normal position illustrated in phantom at A. The pawl has a peripheral abutment 120 which travels in an inner orbit when the pawl is in its normal position at A. When the pin 96, under the influence of the belt 18 accelerates to a predetermined abnormal rate, the pawl 110 under the influence of centrifugal force and its own inertia tends to pivot around the pin 112 and relative to the pin 96 until the set screw 116 abuts the pawl. In this position, illustrated at B the abutment 120 is displaced radially outwardly from the axis of rotation of the pin 96 so that the abutment 120 travels in an outer orbit having a diameter greater than its normal inner orbit. As indicated. each pair of pawls 110 and 108 are mounted 180° out of phase so that when the roller pin 96 accelerates to an abnormal rate, the abutment 120 of one of the pawls will immediately be displaced from its normal inner orbit to its outer orbit.

The motion-transmitting connection between the actuating pawls 108 and 110 and the actuating member 102 comprises a linking member 122 formed of a flat plate having a downwardly bent tab 124 engaged with the actuating member 102. An upwardly bent tab 126 is received by a slot 128 in the plate 24 so that the linking member 122 is mounted for guided up and down movement as well as longitudinal motion. The forward end of the linking member 122 is bent as at 128 to provide means for engaging the abutment 120 of the pawls.

A flat urethane sheet 130 is mounted between the upper surface of the linking member 122 and the lower surface of the mounting plate 24.

Figure 7:
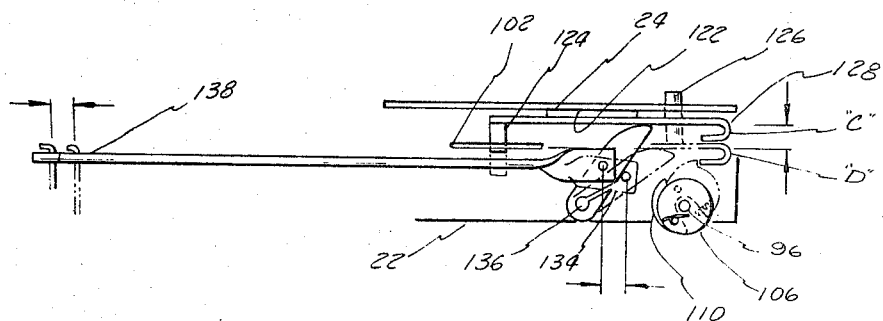
FIG. 7 is a schematic view showing the actuating link pivotal between operative and inoperative positions.
Figure 8:
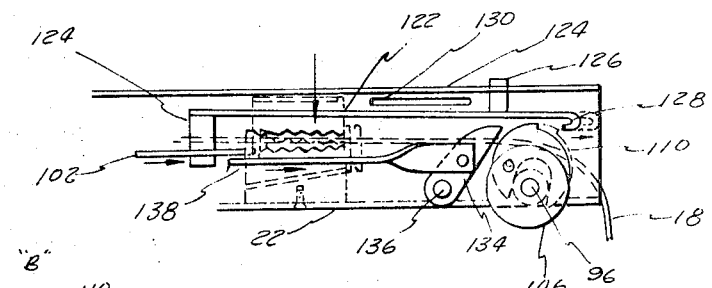
FIG. 8 is a view showing the actuating link in its alterate operating conditions.

Referring to FIGS. 7 and 8, the linking member 122 has an inoperative position illustrated at C wherein the bent section 128 is spaced from an interference position in the outer orbit of the abutments 120 and a lower, operative position illustrated at D where the bent section 128 is disposed in an interference position in the outer orbit of the abutments 120. When the belt 18 is extended to a full operating position, the linking member 122 is in its lower operative position D illustrated in FIG. 8 so that a sudden abnormal acceleration acting on the roller pin 96 causes the abutments 120 of the pawls to catch the bent section 128 of the linking members. Since the pawls are rotating in a clockwise direction as viewed in FIG. 8, they will displace the linking members 122 forwardly in the direction of belt travel. This displacement of the linking members 122 causes the arm 102 to shift forwardly. Since the arm 102 is in abutment with the lower jaw member, it moves the clamping jaws to towards their belt-clamping position.

Thus it can be seen that the linking members 122 and the member 102 provide a motion transmitting connection between the actuating pawls and the belt clamping means when each of the linking members 122 is in its lower operative position D. When the force acting on the belt 18 is released, the belt retracting spring 46 biases the belt 18 to a withdrawn position which causes the belt clamping jaws to shift toward their belt-release position, this movement in turn causing the arm 102 and the linking members 122 to return to their normal rearward position.

It can be seen that when each of the linking members 122 is in its upward inoperative position C rotation of the roller pin 96 at an abnormal rate such as might be associated with the body 10 applying a sharp jerk on the tongue 132 carried at the extended end of the belt 18, will move the pawls toward their outer orbits, the clamping means 28 are operatively disconnected from the actuating means 98 and 100.

The position of each of the linking members 122 is determined by a pair of supporting levers 134 which are pivotably mounted on a pin 136. Pin 136 extends from each of the sidewalls of the channel 22. The forward end of each of the mounting links 122 is supported on the levers 134. One of the levers 134 is pivotable connected to an elongated actuating member 138.

Figure 10:
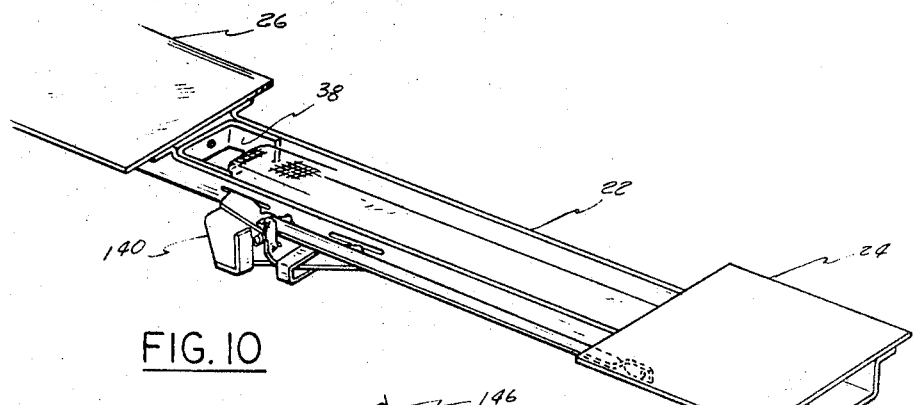
FIG. 10 is a perspective view of the retractor housing showing the switching plate and its associated linkage for sensing the position of the retractor carriage.
Figure 11:
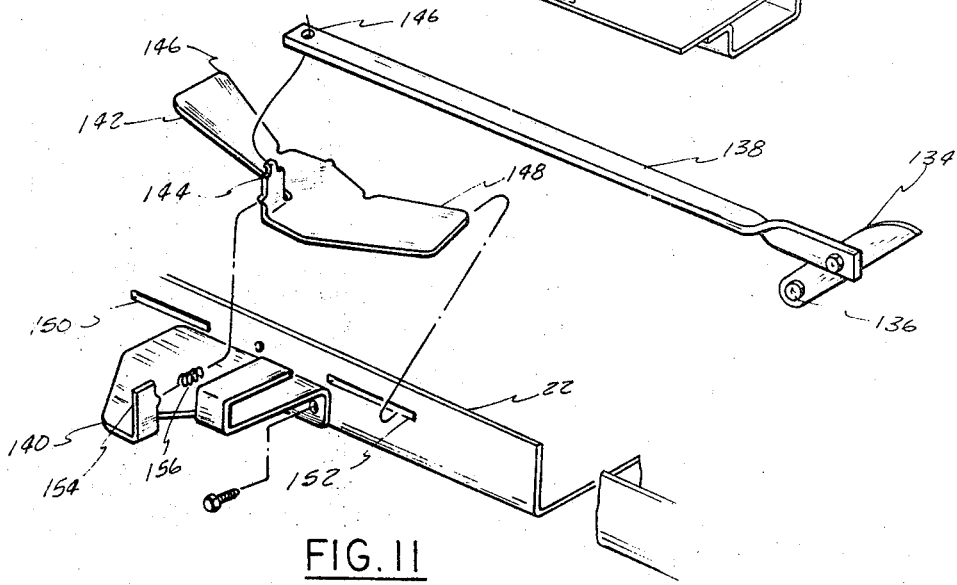
FIG. 11 is an exploded view of the switching plate of FIG. 10.
Figure 12:
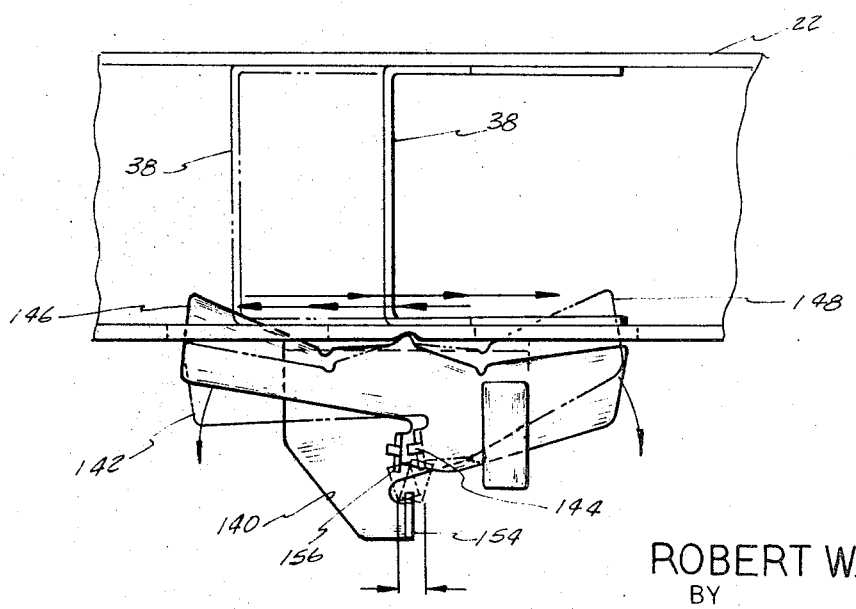
FIG. 12 is a plan view showing the switching plate in its alternate positions.

Referring to FIGS. 10, 11 and 12, a mounting bracket 140 is mounted on the sidewall of the channel 122 and supports a switch plate 142. The switch plate 142 has an upwardly directed tab 144 which registers in an aperture 146 in the member 138 so that as the switch plate 142 is pivoted between a lternate positions, it displaces the member 138 forwardly and rearwardly which in turn raises and lowers the lever 134.

The switch plate 142 has a pair of ears 146 and 148 which register in a pair of slots 150 and 152 in the sidewall of the channel 22. As can best be seen in FIG. 12, the switch plate is mounted such that one of the ears 148 is at all times disposed within the channel 22 and in the path of the retracting carriage 38. The mounting bracket 140 has an upwardly bent tab 154 which provides a seat for an overcenter spring 156 which acts between the tab 144 and the tab 154. As the carriage 38 travels forwardly and rearwardly, it engages one of the ears and pivots the switch plate 142 until the overcenter spring 156 snaps the switch plate to its alternate position.

As can best be seen in FIG. 12, movement of the carriage 38 toward the mouth of the channel 22 allows the belt to extend or move toward the right. As the carriage 38 moves towards the right from a retracted position, the arm 138 is shifted forwardly to lower the lever 134 which in turn moves the linking member 122 so that its forward edge 128 lies in an interference position within the outer orbit of the abutment 120 of the pawls. The switch plate 142 is mounted on the channel 22 so that the linking member 122 drops into its operative position D when the belt has been extended to a position where the body 10 can couple the belt 18 to the lap belt section 16 without prelocking. It can also be seen that as the belt is withdrawn into its stored position, the carriage 38 returns towards the left and engages the ear 146 which is disposed in its path to shift the switch plate 142 so that the ear 146 is pivoted out of the channel 22 and the ear 148 is shifted into an interference position within the channel. As the carriage moves rearwardly and pivots the switch plate 142, the member 138 is shifted rearwardly so that it raises the linking member 122 to the position C so that the belt-clamping means and actuating means are uncoupled.

Thus it is to be understood that the preferred embodiment of the invention provides means for programming the actuating means and the belt-clamping means so that the clamping means can only move toward their belt-clamping position after a predetermined amount of the belt 18 has been extended from its fully stored position. It is to be further understood that even though the belt has been extended sufficiently so that the belt-clamping means can be actuated, the actuating means 98 and 100 permit the body 10 to perform normal body movements with the belt extending and retracting during normal driving conditions, but during an emergency situation, such as a collision the actuating pawls respond to the accelerated belt motion to move the clamping means toward their belt-clamping position.

It is to be understood that although I have described the preferred embodiment of my invention in its simplest terms, various changes and revisions can be made therein without departing from the spirit of the invention.

Having described my invention. I claim:

1. In a safety seat belt assembly adapted for mounting in a vehicle, the combination comprising:
   (a) a safety seat belt having one end adapted for coupling to a body;
   (b) retractor means adapted for mounting on said vehicle and connected to said belt at a point removed from said one end, said retractor means being adapted to retain an elongated section of said belt in a stored position and to act on said belt so that said one end is biased toward said stored position, said retractor means allowing at least a portion of said belt to be withdrawn from said stored position;
   (c) clamping means mounted on said vehicle for engaging said belt between said body and said retracting means, comprising:
      (1) means fixed to said vehicle and providing first and second spaced bearing surfaces, one of said bearing surfaces being inclined with respect to the second of said bearing surfaces;
      (2) a pair of cooperating jaw members having confronting clamping surfaces mounted between said bearing surfaces for coacting motion between a belt-release position and a belt-clamping position, one of said jaw members being engaged with one of said bearing surfaces and the second of said jaw members being engaged with the second of said bearing surfaces so that said confronting clamping surfaces approach one another when said jaw members are moved in a first direction toward said belt-clamping position and move away from one another when said jaw members are moved in an opposite direction toward said belt-release position; and (3) means guiding said belt between said confronting clamping surfaces;

(d) actuating means responsive to said belt being extended from said stored position at a predetermined abnormal rate for moving said jaw members toward said belt-clamping position, and (e) program means for reducing said actuating means inoperative until a predetermined length of said belt has been extended from said stored position.

2. The combination as defined in claim 1, wherein one of said bearing surfaces is inclined with respect to the second of said bearing surfaces at an angle of about 17 degrees.

3. The combination as defined in claim 1, including anti-friction means disposed between said jaw members and said bearing surfaces.

4. The combination as defined in claim 3, wherein said anti-friction means comprises a sheet of a low-friction material disposed between each of said jaw members and their respective bearing surfaces.

5. The combination as defined in claim 3, wherein said anti-friction means comprises roller bearing means mounted between at least one of said jaw members and its respective bearing surface.

6. The combination as defined in claim 1, wherein said pair of jaw members are normally in said belt-release position and including means responsive to the motion of said belt for moving said jaw members toward said belt-clamping position.

7. The combination as defined in claim 1, wherein said belt is movable from said stored position within said retractor means and between said jaw members in a first direction and said pair of jaw members move together from said belt-release position toward said belt-clamping position in said first direction.

8. The combination as defined in claim 7, wherein said retractor means comprises a linear retractor for storing said belt into a series of linear sections.

9. The combination as defined in claim 8, wherein said linear retractor is adapted for mounting to an overhead portion of said vehicle above the body coupled to said belt.

10. In a safety seat belt assembly adapted for mounting in a vehicle, the combination comprising:

(a) a safety seat belt having one end adapted for coupling to a body;

(b) retractor means connected to said belt at a point removed from said one end for biasing said belt toward a stored position, said retractor means permitting said belt to be withdrawn from said stored position;

(c) clamping means mounted on said vehicle and adapted to engage said belt upon actuation; and (d) actuating means operatively connected to said clamping means, comprising:

(1) support means;

(2) a roller rotatably mounted on said support means, said belt being wrapped around a circumferential portion of said roller so that said roller rotates with the movement of said belt;

(3) a pawl eccentrically mounted on said roller and rotatable therewith, said pawl being pivotal between first and second positions;

(4) an abutment carried by said pawl, said abutment normally revolving in a first orbit when said pawl is in said first position and revolving in a second orbit having a greater diameter than said first orbit when said pawl is in said second position;

(5) bias means urging said pawl to said first position, the mass of said pawl creating a force in opposition to said bias means to pivot said pawl to said second position when said roller means are rotated by said belt at a predetermined rotational acceleration; and (6) motion-transmitting linkage connecting said pawl to said clamping means when said pawl is in said second position, said motion-transmitting linkage being operative to actuate said clamping means into a belt-engaging position from a belt-release position.

11. The combination as defined in claim 10, including means for varying the distance said pawl pivots from said first position to said second position.

12. The combination as defined in claim 10, wherein said pawl moves from said first position to said second position when said roller is rotated at said predetermined rotational acceleration by said belt being extended from the stored position within said retractor.

13. The combination as defined in claim 10, including means for rendering said motion-transmitting linkage inoperative until a predetermined length of said belt has been extended from said stored position.

14. The combination as defined in claim 10, wherein said motion-transmitting linkage has a link and including means for supporting said link for movement toward and away from an interference position in the second orbit of said abutment, said link being engageable with said abutment in said interference position to actuate said clamping means and including sensing means responsive to a predetermined length of said belt being extended from the stored position within said retractor means to move said link toward said interference position, said sensing means being operative to move said link away from said interference position when less than a predetermined length is extended from the stored position within said retractor means so that said clamping means cannot be actuated to a belt-clamping condition unless said predetermined length of belt has been extended from said stored position.

15. The combination as defined in claim 14, wherein said retractor means comprises a linear retractor adapted for mounting to an overhead portion of said vehicle above the body coupled to said belt.

16. In a safety seat belt assembly adapted for mounting in a vehicle, the combination comprising:

(a) a safety seat belt having one end adapted for coupling to a body;

(b) retractor means adapted for mounting on said vehicle and connected to said belt to a point removed from said one end, said retractor means being adapted to retain an elongated section of said belt in a stored position and to act on said belt so that said one end is biased toward said stored position, said retractor means being yieldable to a pull-out force applied on said belt so that at least a portion of said belt can be withdrawn from said stored position;

(c) clamping means adapted for mounting on said vehicle for engaging said belt between said retractor means and said one end; and (d) program means for disabling said clamping means until a predetermined length of said belt has been withdrawn from the stored position in said retractor means.

17. The combination as defined in claim 16, wherein said clamping means are responsive to said belt being extended from said retracted position at an abnormal rate.

18. The combination as defined in claim 16, wherein said retractor means are mounted on an overhead portion of said vehicle so that said belt can be coupled to said body to form an upper torso restraining force.

19. The combination as defined in claim 16, wherein said retractor means comprise:

(a) an elongated housing having a belt-receiving opening and adapted for mounting to an overhead portion of said vehicle;

(b) first roller means fixedly mounted within said housing;

(c) a carriage mounted for movement within said housing toward and away from said first roller means;

(d) second roller means carried by said carriage;

(e) spring bias means urging said carriage away from said first roller means;

(f) said belt being wrapped around said first and second roller means into a series of linear sections and extending through said belt-receiving opening, so that the movement of the carriage away from said first roller means increase the length of said linear sections to retract said belt through said belt-receiving opening, and the movement of said carriage towards said first roller means permits the reduction in length of said linear sections so that said belt can be extended through said belt-receiving opening; and (g) motion-transmitting linkage connecting said clamping means and said carriage and responsive to the position of said carriage within said housing to render said clamping means inoperative until a predetermined amount of said belt has been withdrawn from within said housing.

20. The combination as defined in claim 16, wherein said clamping means comprises:

(a) means fixedly mounted on said vehicle and providing first and second spaced bearing surfaces, one of said bearing surfaces being inclined with respect to the second of said bearing surfaces;

(b) a pair of cooperating jaw members having confronting clamping surfaces being mounted between said bearing surfaces for coacting motion in directions parallel to the direction of convergence of said bearing surfaces between a belt-release position and a belt-clamping position, one of said jaw members being engaged with one of said bearing surfaces and the second of said jaw members being engaged with the second of said bearing surfaces so that said confronting clamping surfaces approach one another when said jaw members are moved in a first direction from said belt-release position and toward said belt-clamping position and move away from one another when said jaw members are moved in an opposite direction from said belt-clamping position and toward said belt-release position; and (c) means guiding said belt between said confronting clamping surfaces.

21. The combination as defined in claim 16, wherein said program means comprises means for sensing the amount of said belt disposed in said stored position.

22. The combination as defined in claim 16, wherein said retractor means comprises first and second spaced roller means for storing said belt in a series of linear sections, said roller means being movable toward a greater relative spacing to increase the length of said linear sections when said belt is retracted into said stored position and movable toward a lesser relative spacing to decrease the length of said linear sections when said belt is extended from said stored position, and wherein said program means comprises means for sensing the relative spacing between said roller means.

23. The combination as defined in claim 22, including actuating means for moving said jaw members from said belt-release position towards said belt-clamping position in response to said belt being extended from said stored position at an abnormal rate.

24. In a safety seat belt system for a vehicle, the combination comprising:

(a) a support adapted for mounting on the vehicle, said support having a pair of spaced, opposed bearing surfaces, one of said bearing surfaces being inclined with respect to the second of said bearing surfaces;

(b) a pair of cooperating jaw members disposed between said bearing surfaces, said jaw members having confronting clamping surfaces for engaging a seat belt and being movable between a clamping position in which the jaw members are wedged between said bearing surfaces and a release position in which the jaw members are separated, one from the other;

(c) a seat belt having a portion disposed between the clamping surfaces of the jaw members;

(d) means for urging the jaw members to their clamping position in response to a predetermined rate of belt movement to connect the belt to the support, and (e) means for rendering said clamping means inoperative until a predetermined length of said belt has been extended from said stored position.

25. The invention as defined in claim 24, including means for moving said jaw members toward their release position from their clamping position to release the belt from between said clamping surfaces so as to allow motion of the belt.

26. The invention as defined in claim 25, wherein said means comprises structure inter-connecting the two jaw members so that motion of one of said jaw members towards its release position moves the second of said jaw members towards its release position.

27. The invention as defined in claim 26, wherein motion of the belt in the direction from the clamping position toward the release position of the jaw members, when the jaw members are in their clamping position, moves the jaw members with the belt and toward their release position.

28. The invention as defined in claim 24, wherein the clamping surface of one of the jaw members has ridges and grooves formed transversely to the direction of motion of the two jaw members between their clamping and release positions which oppose similarly formed ridges and grooves of the second of said jaw members.

References Cited
UNITED STATES PATENTS

| | | | |
|---|---|---|---|
| 3,371,960 | 3/1968 | Bayer | 280—150 |
| 3,400,977 | 9/1968 | Jones | 280—150 |
| 3,442,529 | 5/1969 | Lewis | 280—150 |

FOREIGN PATENTS

| | | | |
|---|---|---|---|
| 706,541 | 3/1954 | Great Britain | 24—171 |

BENJAMIN HERSH, Primary Examiner

R. R. SONG, Assistant Examiner

U.S. Cl. X.R.

280—150; 297—389